(12) United States Patent
Mubaslat et al.

(10) Patent No.: US 12,537,468 B2
(45) Date of Patent: Jan. 27, 2026

(54) REMOTE ACTUATION SYSTEMS AND METHODS

(71) Applicant: HONEYWELL INTERNATIONAL INC., Charlotte, NC (US)

(72) Inventors: Saed Mubaslat, Urbana, OH (US); Walter Niewiadomski, Phoenix, AZ (US); Brian West, Clearwater, FL (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 119 days.

(21) Appl. No.: 18/526,831

(22) Filed: Dec. 1, 2023

(65) Prior Publication Data
US 2025/0183830 A1 Jun. 5, 2025

(51) Int. Cl.
*H02P 23/14* (2006.01)
*H02P 27/06* (2006.01)

(52) U.S. Cl.
CPC .............. *H02P 23/14* (2013.01); *H02P 27/06* (2013.01)

(58) Field of Classification Search
CPC ........ H02P 23/0027; H02P 27/06; H02P 6/06; H02P 23/14; H02P 2201/11; H02P 2101/30; H02P 2101/45; H02P 2101/25; H02P 2101/40; H02P 2201/07; H02P 2201/09; H02P 2205/07; H02P 2207/01; H02P 2209/05; H02P 2207/076; H02P 25/188; H02P 31/00; H02P 6/16; H02P 27/08;

(Continued)

(56) References Cited

U.S. PATENT DOCUMENTS 4,030,015 A 6/1977 Herko et al.
5,471,353 A 11/1995 Codilian et al.
(Continued)

FOREIGN PATENT DOCUMENTS

CN 204761343 U 11/2015
CN 106301148 A 1/2017
(Continued)

OTHER PUBLICATIONS

A. Mohammad, M. A. Abedin and M. Z. R. Khan, "Implementation of a three phase inverter for BLDC motor drive," 2016 9th International Conference on Electrical and Computer Engineering (ICECE), Dhaka, Bangladesh, 2016, pp. 337-340, doi: 10.1109/ICECE.2016.7853925.

(Continued)

*Primary Examiner* — Antony M Paul
(74) *Attorney, Agent, or Firm* — Ingrassia, Fisher & Lorenz LLP

(57) ABSTRACT

Fly-by-wire vehicle systems and related actuation systems and operating methods are provided for actuating a remote flight control component. An exemplary system includes a voltage regulation arrangement between a power supply input node and a reference voltage node to provide a regulated output voltage at the reference voltage node, a power conversion arrangement between the reference voltage node and an output node to provide power from the reference voltage node to an electrical load coupled to the output node, and a control module coupled to the voltage regulation arrangement to provide a command to vary the regulated output voltage at the reference voltage node based on feedback measurement data pertaining to the electrical load.

20 Claims, 5 Drawing Sheets

(58) Field of Classification Search
CPC ........ H02P 21/0021; H02P 27/16; H02P 6/14;
H02P 25/03; H02P 6/085; H02P 6/08;
H02P 9/302; H02P 25/22; H02P 27/04;
H02P 29/028; H02P 6/20; H02P 2207/05;
H02P 21/00; H02P 2103/20; H02P
27/045; H02P 29/40; H02P 5/46; H02P
6/04; H02P 6/28; H02P 1/46; H02P
23/07; H02P 25/022; H02P 25/026; H02P
6/17; H02P 9/305; H02P 9/44; H02K
11/33; H02K 41/03; H02K 17/02; H02K
41/031; H02K 29/06; B63H 2021/202;
B60L 2240/421; B60L 2220/14; B60L
2240/12; B60L 2210/40; B60L 2240/429;
B60L 3/0061; B60L 2200/10; B60L
3/0023; B60L 50/51; B60L 2240/427;
B60L 2240/441; B60L 7/14; B60L
2240/461; B60L 2220/12; B60L 3/003;
B60L 2220/54; B60L 2240/527; B60L
2240/547; B60L 50/30

See application file for complete search history.

(56) References Cited

U.S. PATENT DOCUMENTS

| | | |
|---|---|---|
| 8,536,811 B2 | 9/2013 | Wrobel et al. |
| 8,558,501 B2 | 10/2013 | Tsunematsu et al. |
| 9,503,001 B2 | 11/2016 | Wasson et al. |
| 11,267,574 B2 | 3/2022 | Benson et al. |
| 2005/0017672 A1 | 1/2005 | Suzuki et al. |
| 2018/0022576 A1 | 1/2018 | Jiang et al. |
| 2020/0127591 A1 | 4/2020 | Ishida et al. |
| 2020/0215922 A1* | 7/2020 | Sawata ................ F02B 63/042 |
| 2021/0006188 A1 | 1/2021 | Endo et al. |
| 2023/0057522 A1 | 2/2023 | Fujiwara et al. |
| 2023/0412097 A1 | 12/2023 | Arafat et al. |

FOREIGN PATENT DOCUMENTS

| | | |
|---|---|---|
| CN | 207835370 U | 9/2018 |
| CN | 210011900 U | 2/2020 |
| CN | 108574442 B | 3/2021 |
| CN | 113904595 A | 1/2022 |
| CN | 115913001 A | 4/2023 |
| EP | 1187306 B1 | 11/2005 |
| EP | 2611025 A1 | 7/2013 |
| IT | 201900015860 A1 | 3/2021 |
| JP | 6379817 B2 | 8/2018 |
| KR | 20000049658 A | 8/2000 |
| KR | 1020000049658 A | 8/2000 |
| KR | 100626220 B1 | 9/2006 |
| WO | 2024077213 A1 | 4/2024 |

OTHER PUBLICATIONS

Gunhee Jang and M.G. Kim, "A Bipolar-Statring and Unipolar-Running Method to Drive a Hard Disk Drive Spindle Motor at high Speed with Large Starting Torque," IEEE Transaction on Magnets, vol. 41, No. 2, Feb. 2005.

* cited by examiner

REMOTE ACTUATION SYSTEMS AND METHODS

TECHNICAL FIELD

The subject matter described herein relates generally to vehicle systems, and more particularly, embodiments of the subject matter relate to motor control systems and methods for vertical take-off and landing (VTOL) aircraft and other aircraft systems.

BACKGROUND

In some modern aircraft, traditional mechanical flight control systems have been replaced with electrically controlled actuators, often referred to as fly-by-wire. Instead of mechanical linkages between cockpit controls and flight control surfaces, propulsion systems and/or lift systems, electrical signals are utilized to communicate movements of cockpit controls to the controllers associated with the appropriate flight control components or systems. Vertical take-off and landing (VTOL) aircraft or other aircraft non-conventional aircraft may include any number of different actuators or effectors arranged or distributed at various locations throughout the body of the aircraft and operated independently of one another to provide lift, propulsion, and/or attitude control for the aircraft (e.g., propellers, lift fans, rotors, flight control surface actuators, and/or the like), which increases the amount of wiring and interfaces required. For smaller aircraft, such as air taxis or other urban air mobility (UAM) vehicles, it is often desirable to minimize the amount of wiring, weight, and associated costs.

In aviation contexts or other safety critical applications, it is desirable to provide redundancy and fail operational systems. However, traditional power converters and motor controllers typically have various inefficiencies, limitations or other disadvantages as applied to aviation applications, such as VTOL aircraft. For example, direct current (DC) to DC converters may be limited to fixed outputs or other fixed parameters that are highly dependent on hardware, while also lacking redundant and efficient control algorithms capable of adaptively adjusting parameters to account for different power demands at different motor torques or motor speeds that may arise in a VTOL application. Accordingly, it is desirable to provide motor control systems and methods that are fail operational and capable of providing or otherwise supporting redundancy to avoid potential single points of failure. Other desirable features and characteristics will become apparent from the subsequent detailed description and the appended claims, taken in conjunction with the accompanying drawings and the foregoing technical field and background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Fly-by-wire vehicle systems and related remote actuation systems and operating methods are provided. An exemplary system includes a voltage regulation arrangement coupled between a power supply input node and a reference voltage node, wherein the voltage regulation arrangement is operable to provide a regulated output voltage at the reference voltage node, a power conversion arrangement coupled between the reference voltage node and an output node to provide power from the reference voltage node to an electrical load coupled to the output node, and a control module coupled to the voltage regulation arrangement to provide a command to vary the regulated output voltage at the reference voltage node based on feedback measurement data pertaining to the electrical load.

An exemplary method of operating an electrical load is also provided. The method involves operating a power conversion arrangement coupled between a reference voltage node and an output node coupled to the electrical load to provide power from the reference voltage node to the electrical load, obtaining measurement feedback associated with operation of the electrical load in response to the power from the reference voltage node, and operating a voltage regulation arrangement coupled to the reference voltage node to adjust a regulated output voltage at the reference voltage node based on a difference between the measurement feedback and a performance target associated with the electrical load while concurrently operating the power conversion arrangement to adjust the power to the electrical load in response to adjusting the regulated output voltage.

An apparatus is also provided for a non-transitory computer-readable medium having computer-executable instructions stored thereon that, when executed by a processing system, cause the processing system to operate a power conversion arrangement coupled between a reference voltage node and an output node coupled to an electrical load to provide power from the reference voltage node to the electrical load, obtain measurement feedback associated with operation of the electrical load in response to the power from the reference voltage node, and operate a voltage regulation arrangement coupled to the reference voltage node to adjust a regulated output voltage at the reference voltage node based on a difference between the measurement feedback and a performance target associated with the electrical load while concurrently operating the power conversion arrangement to adjust the power to the electrical load in response to adjusting the regulated output voltage.

Furthermore, other desirable features and characteristics of the subject matter described herein will become apparent from the subsequent detailed description and the appended claims, taken in conjunction with the accompanying drawings and the preceding background.

BRIEF DESCRIPTION OF DRAWINGS

The present disclosure will hereinafter be described in conjunction with the following drawing figures, wherein like numerals denote like elements, and wherein.

DETAILED DESCRIPTION

Figure 1:
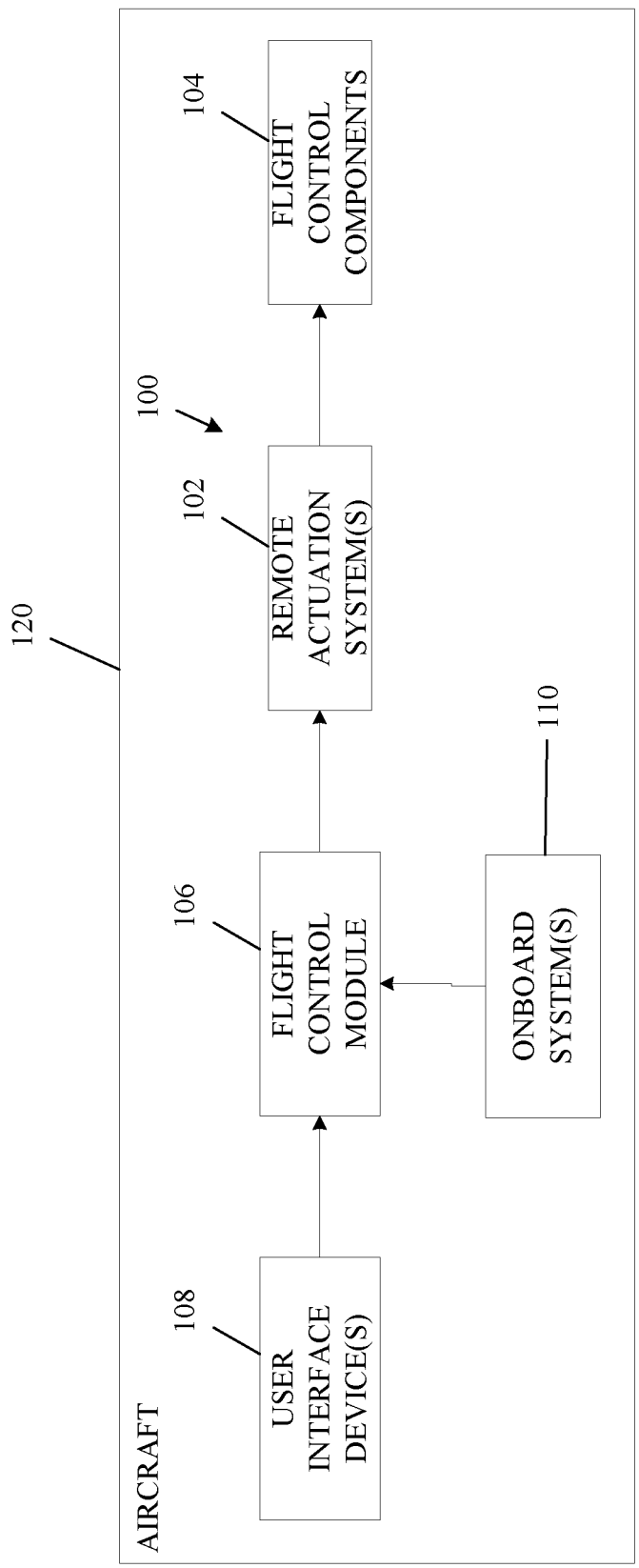
FIG. 1 is a block diagram illustrating a fly-by-wire system suitable for use with a vehicle such as an aircraft in accordance with one or more exemplary embodiments.

The following detailed description is merely exemplary in nature and is not intended to limit the subject matter of the application and uses thereof. Furthermore, there is no intention to be bound by any expressed or implied theory presented in the preceding technical field, background, brief summary, or the following detailed description.

Embodiments of the subject matter described herein relate to electrically controlled vehicle systems. For purposes of explanation, the subject matter is described herein primarily in the context of aircraft where flight control components are controlled using electrical signals, however, the subject matter is not necessarily limited to use with aircraft and may be implemented in an equivalent manner for other types of vehicles (e.g., automotive vehicles, marine vessels, or the like). That said, exemplary embodiments may be described herein in the context of urban air mobility (UAM) vehicles or other vertical takeoff and landing (VTOL) aircraft that includes various remote actuation systems that actuate or otherwise operate flight control components which provide lift, propulsion, and/or attitude control for the aircraft, such as, for example, a flight control surface actuator, lift fan, motor, or similar flight control component capable of adjusting or otherwise influencing a position or orientation of the aircraft.

As described in greater detail below, in exemplary embodiments, a regulated voltage provided to a power conversion arrangement (e.g., an inverter or other power converter) driving an electrical load is varied or otherwise adjusted based on measurement feedback to achieve a performance target or otherwise reduce a difference between the current state of operation of the electrical load and the performance target. For example, in the context of a UAM vehicle, a VTOL aircraft, or other type of aircraft or rotorcraft, the electrical load may be realized as an electric motor or other actuator associated with a flight control component, where the amplitude and/or frequency of the regulated voltage output from a voltage regulation arrangement as the supply reference voltage to one or more inverter phase legs is varied or otherwise adjusted to correspondingly influence the actuation of the motor to achieve the performance target(s) associated with the motor and/or the flight control component (e.g., a commanded motor speed target, a commanded motor position target, and/or the like). Thus, rather than varying the modulation or operation of the power conversion arrangement, which could otherwise increase losses and/or reduce efficiency, the regulated output voltage from the more voltage regulation arrangement is adjusted, thereby reducing complexity associated with operation of the power conversion arrangement and allowing the operation of the power conversion arrangement to be optimized or tailored to achieve a desired level of efficiency or performance. In this regard, by utilizing programmable and adjustable voltage regulation, the power conversion arrangement may be configurable to support different types of modulation (e.g., pulse width modulation (PWM), pulse amplitude modulation (PAM), pulse frequency modulation (PFM) and/or the like) as well as different types of commutation or effective winding configurations of the electric motor to improve efficiency, reliability, redundancy and/or the like.

For example, in one or more exemplary embodiments, the electric motor may be realized as a six-phase motor that includes six sets of stator windings, with the inverter or other power converter being operated to commutate the six-phase motor as a brushless direct current (BLDC) motor at relatively lower motor speeds (e.g., motor speeds below a speed threshold) or when the actuation commands for the motor and/or flight control component correspond to an increased torque demand. While operated as a six-phase BLDC motor, the inverter phase legs may be activated and deactivated in the appropriate sequence with the appropriate duty cycle and switching frequency to rotate the rotor of the BLDC motor in the commanded direction of rotation with the desired motor speed. In this regard, while operating the motor as a six-phase BLDC motor, the measured motor speed, measured motor position, measured motor current and/or the like may be fed back to a control module or other processing that implements various control algorithms, logic or other software to compare the feedback measurements indicative of the current state of actuation of the motor to the targeted actuation of the motor corresponding to the actuation commands received from a supervisory system. When a difference between the measured actuation of the motor and the targeted actuation of the motor exists, a programmable voltage regulation arrangement supplying power to the respective inverter phase legs may be commanded to adjust or otherwise vary the amplitude of a regulated direct current (DC) voltage output provided to the inverter phase legs to reduce or otherwise eliminate the difference, and thereby regulate the actuation of the motor to the commanded or targeted actuation by varying the regulated supply voltage rather than varying operation of the inverter phase legs.

Thereafter, when the motor speed is greater than or equal to a speed threshold, the inverter may be commanded to transition to commutating the six-phase motor as a three-phase alternating current (AC) asynchronous induction motor, for example, by deactivating three phase legs of the inverter (e.g., a duty cycle of 0%) while activating three other phase legs to provide a substantially sinusoidal AC voltage to the respective sets of stator windings that are configured to provide effective three-phase operation. While operated as a three-phase AC induction motor, the inverter phase legs may be maintained activated (e.g., a duty cycle of 100%) to allow the programmable voltage regulation arrangements supplying power to the respective inverter phase legs to provide a regulated or controlled AC voltage to the respective phase legs. In such a configuration, the programmable voltage regulation arrangement supplying power to the inactive inverter phase legs may be commanded or otherwise configured to deactivate to improve efficiency by minimizing losses associated with supplying a regulated voltage to an inactive phase leg. While operating the motor as a three-phase AC motor, the measured motor speed, measured motor position, measured motor current and/or the like may similarly be fed back to a control module or other processing that implements various control algorithms, logic or other software to regulate actuation of the motor to the targeted actuation. In this regard, when a difference between the measured actuation of the motor and the targeted actuation of the motor exists, the programmable voltage regulation arrangements supplying power to the respective inverter phase legs may be commanded to adjust or otherwise vary the amplitude and/or frequency of the regulated alternating current (AC) voltage output provided to the inverter phase legs to reduce or otherwise eliminate the difference, and thereby regulate the actuation of the motor to the commanded or targeted actuation by varying the regulated supply voltage rather than varying operation of the inverter phase legs.

FIG. 1 depicts an exemplary embodiment of a fly-by-wire system 100 suitable for use with a vehicle such as an aircraft 120. In exemplary implementations, the aircraft 120 is realized as a UAM vehicle, a VTOL aircraft, or another aircraft that includes multiple different remote actuation systems 102 that are operable to control or otherwise manage respective flight control components 104 (e.g., propellers, lift fans, flight control surfaces and/or the like) distributed about the body of the aircraft 120, and thereby, control the position, orientation and/or attitude of the aircraft 120. In exemplary implementations, each remote actuation system 102 manages a unique flight control component 104 (or a set of flight control components) that is different from those flight control components 104 managed by other remote actuation system 102. That said, in practice, some implementations may employ redundancy, where more than one remote actuation system 102 is capable of operating a common flight control component 104.

The remote actuation systems 102 are communicatively coupled to a flight control module 106, which generally represents the processing system, processing device, hardware, circuitry, logic, software, firmware and/or other components of the fly-by-wire system 100 that are configured to receive signals indicative of a sensed or measured position, orientation, or adjustment to user interface devices 108 associated with the aircraft 120 and convert the inputs or adjustments received at the user interface devices 108 into corresponding command signals for one or more flight control components 104 and output or otherwise provide the command signals to the remote actuation systems 102. For purposes of explanation, the flight control module 106 may alternatively be referred to herein as a flight control computer (FCC). The flight control computer 106 may be implemented or realized using any suitable processing system and/or device, such as, for example, one or more processors, central processing units (CPUs), controllers, microprocessors, microcontrollers, processing cores and/or other hardware computing resources configured to support the operation described herein. In this regard, each flight control computer 106 may include or access a data storage element (or memory) capable of storing programming instructions for execution that, when read and executed by the flight control computer 106, cause the flight control computer 106 to support operations of the fly-by-wire system 100. In practice, some implementations may employ redundancy, where multiple different instances of the flight control computer 106 independently determine and provide redundant command signals to a remote actuation system 102 concurrently.

The user interface devices 108 may be realized as one or more cockpit user interface devices onboard the aircraft 120, such as, for example, a joystick, lever, switch, knob, line select key, touch panel (or touchscreen), keypad, touchpad, keyboard, mouse or another suitable device adapted to receive input from a user. For example, the user interface devices 108 may be realized as joysticks including one or more sets of sensors configured to sense the position of a respective joystick in a reference direction (e.g., a horizontal or x-reference direction, a vertical or y-reference direction and/or the like), with each sensor being coupled to the flight control computer 106 to provide indicia of the user input position of the respective joystick. That said, it should be noted that although the subject matter may be described herein primarily in the context of pilot inputs or other input received via user interface devices 108 utilized to operate flight control components 104 in fly-by-wire aircraft 120, the subject matter described herein is not intended to be limited to any particular type of input to the flight control computer 106, and may be utilized in the context of any other type of measurement or command data (e.g., flight plan data) that may be input to a flight control module 106 for purposes of determining commands for operating the flight control components 104. Accordingly, the subject matter may be implemented in an equivalent manner for autonomously or remotely controlled aircraft. One or more exemplary arrangements of cockpit user interface devices, sensors, and flight control computers are described and depicted in U.S. Pat. No. 11,155,341, which is incorporated by reference herein.

In practice, onboard systems 110 are communicatively coupled to the flight control computer 106 to provide real-time data and/or information regarding the operation of the aircraft 120 to the flight control computer 106 for analysis in conjunction with the user input received via the user interface device(s) 108. For example, in the context of an aircraft 120, the onboard systems 110 may include one or more avionics systems that support navigation, flight planning, and other aircraft control functions, and in practice, will likely include one or more of the following avionics systems suitably configured to support operation of the aircraft: a flight management system (FMS), a navigation system, a communications system, an autopilot system, an autothrust system, a weather system, an air traffic management system, a radar system, a traffic avoidance system, hydraulics systems, pneumatics systems, environmental systems, electrical systems, engine systems, trim systems, lighting systems, crew alerting systems, electronic checklist systems, an electronic flight bag and/or another suitable avionics system. Based on the data or information received from the respective onboard systems 110 and the user input to a respective user interface device 108, the flight control computer 106 commands for controlling the position of or otherwise operating one or more of the flight control components 104 to adjust the position and/or attitude of the aircraft 120.

During operation of the aircraft, the flight control computer 106 continually analyzes the outputs of the user interface devices 108 and the onboard avionics systems 110 to determine corresponding commands for how the respective flight control components 104 should be operated in response to adjustments or changes to the user interface devices 108 substantially in real-time. In this regard, in exemplary implementations, the flight control computer 106 calculates or otherwise determines a rate or amount of actuation associated with a particular flight control component 104 to adjust the position and/or attitude of the aircraft 120 in a manner corresponding to the user input received via a user interface device 108 and provides a corresponding command signal to the remote actuation system 102 associated with that flight control component 104 to effectuate the received user input.

In exemplary embodiments, the flight control computer 106 calculates or otherwise determines a desired rate and direction of actuation for a motor or other actuator associated with a remote actuation system 102 to produce the desired actuation of the flight control component(s) 104 associated with that remote actuation system 102 to adjust the position and/or attitude of the aircraft 120 in the desired manner and provides a corresponding command signal to the remote actuation system 102 for implementation. As described in greater detail below in the context of FIG. 2, in exemplary embodiments, the command signal has a signal characteristic indicative of a commanded rotation and a commanded rotational direction for a motor associated with the remote actuation system 102.

Figure 2:
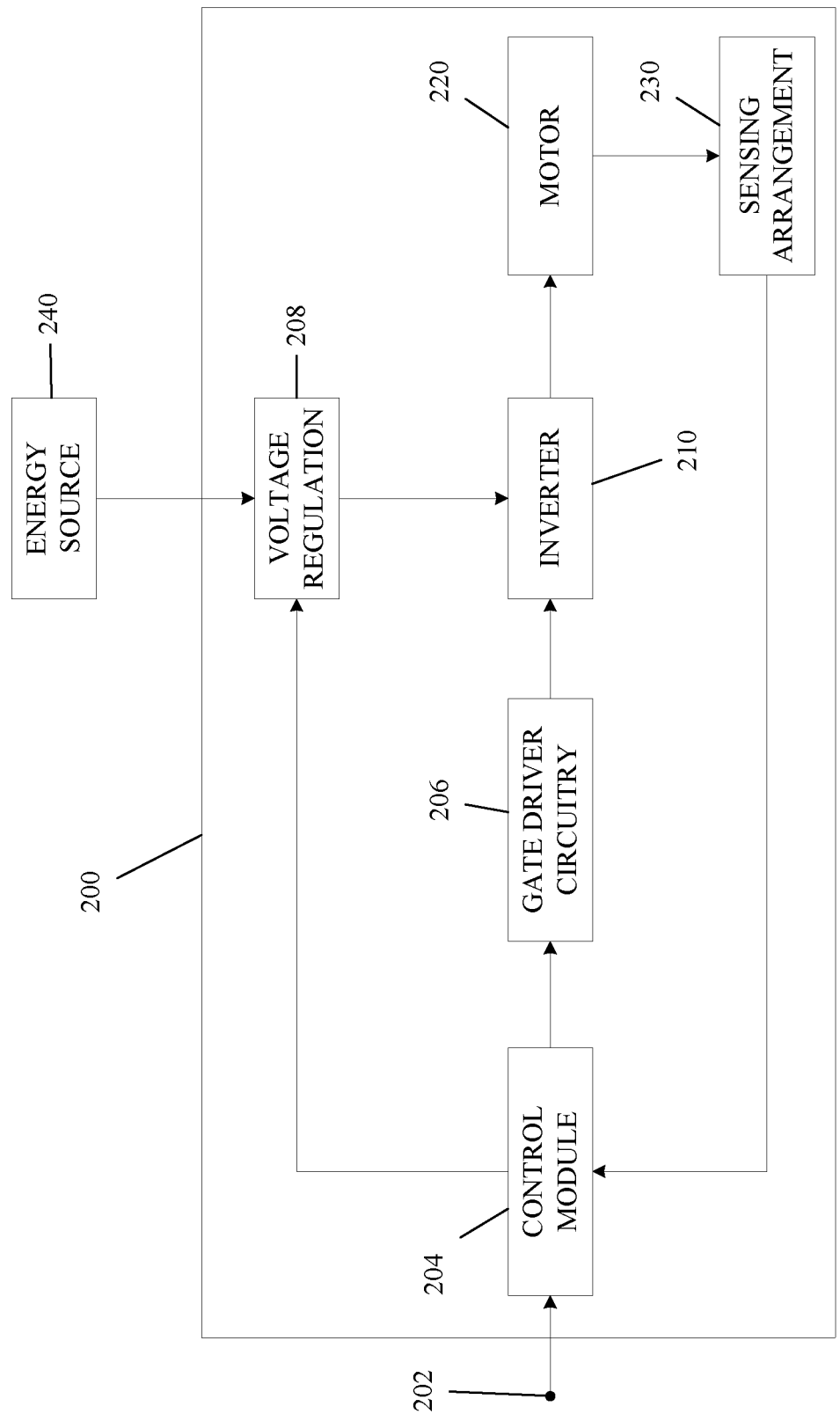
FIG. 2 is a block diagram of an actuation system suitable for use as a remote actuation system to control a flight control component responsive to an input command signal from a flight control module in the fly-by-wire system of FIG. 1 in an exemplary embodiment.

FIG. 2 depicts an exemplary embodiment of an actuation system 200 suitable for use as a remote actuation system 102 in the fly-by-wire system 100 of FIG. 1. In this regard, the actuation system 200 includes an actuator 220 that is capable of being mechanically coupled to or otherwise configured to actuate a flight control component 104 to influence the position and/or attitude of an aircraft 120, as described above. For purposes of explanation, the subject matter is described herein in the context of the actuator 220 being realized as a motor that is operable using a power conversion arrangement such as an inverter 210; however, it should be appreciated that the subject matter described herein is not necessarily limited to any particular type of actuator, power conversion arrangement or combination thereof.

The illustrated actuation system 200 includes an input interface 202, which generally represents the pins, connectors, terminals, ports or other input nodes associated with the actuation system 200 capable of being connected or otherwise coupled to an electrical cable or wiring for receiving an input command signal from a flight control computer or other supervisory control module external to the actuation system 200. The actuation system 200 includes control module 204, which generally represents hardware, software, firmware and/or other components that are coupled to the input interface 202 to receive the input command signal and automatically convert the input command signal into a corresponding rotational speed command and commanded rotational direction for the motor 220 to produce the desired actuation of a flight control component. In this regard, the control module 204 may include or otherwise be implemented or realized using any suitable processing system and/or device, such as, for example, one or more processors, central processing units (CPUs), controllers, microprocessors, microcontrollers, processing cores and/or other hardware computing resources configured to support the operation described herein. In various implementations, the control module 204 includes or accesses a data storage element (or memory) capable of storing programming instructions for execution that, when read and executed by the control module 204, cause the control module 204 to control operation of the motor 220 via the inverter 210 to support operations of the fly-by-wire system 100. In exemplary In the illustrated implementation, the control module 204 is coupled to a sensing arrangement 230, which generally represents one or more position sensors, speed sensors, current sensors and/or other sensing elements associated with the motor 220 that provide measurement data indicative of the current state of the motor 220 substantially in real-time (e.g., the current rotor position, the current speed, the current motor current, the current output torque, and/or the like), which, in turn, is utilized by the control module 204 to convert commands received at the input interface 202 indicative of a commanded rotational speed and/or a commanded rotational direction into corresponding power conversion commands for operating the inverter 210 to apply voltage and excite phases of the motor 220 in the appropriate sequence and manner for achieving the commanded rotational speed in the commanded rotational direction given the current position or state of the motor 220. For example, based on a current rotor position indicated by rotor position measurement data received from a position sensing arrangement 230 and a commanded rotational direction, the control module 204 may determine the appropriate sequence or order for exciting the phases of the motor 220 to produce rotation in the commanded direction and generate corresponding power conversion commands for operating the corresponding phases (or phase legs) of the inverter 210 to provide input power to those phases of the motor 220 in that order. Additionally, based on the commanded rotational speed, the control module 204 may determine the corresponding magnitude or duty cycle for the power conversion commands to result in the appropriate amount of power input to the motor 220 to achieve the commanded rotational speed.

In the illustrated embodiment, the control module 204 is coupled to gate driver circuitry 206, which generally represents the transistors, switches and/or other circuitry that is configured to activate or deactivate respective phases of the inverter 210 in accordance with the power conversion command signals from the control module 204 to enable the desired direction of current flow through the respective phases of the motor 220 to produce rotation of the rotor of the motor 220 in the commanded rotational direction. The gate driver circuitry 206 also activates or deactivates the respective phases of the inverter 210 for a duration of time (or duty cycle) in accordance with the power conversion command signals to provide the amount of input power for achieving the commanded rotational speed. For example, in one or more implementations, the power conversion command signals output by the control module 204 are realized as pulse-width modulated (PWM) duty cycle command signals or are otherwise indicative of desired PWM duty cycles corresponding to the duration of time for which each respective phase leg of the inverter 210 should be activated to provide the amount of input power to the respective phases of the motor 220 that achieves the commanded rotational speed.

The inverter 210 generally represents the combination of transistors, diode and/or other power conversion circuitry that is operable to convert DC input power from an energy source 240 into alternating current (AC) output power that is applied to the respective phases of the motor 220 in accordance with the power conversion command signals determined by the control module 204. In this regard, the power conversion commands generated by the control module 204 cause the gate driver circuitry 206 to activate the phase legs of the inverter 210 to apply the input DC voltage and/or current for a duration of a control period that corresponds to the PWM duty cycle determined by the control module 204.

In one or more exemplary implementations, the motor 220 is realized as a brushless DC (BLDC) electric motor where the inverter 210 is operated to provide input current to the different phases of the motor stator windings in the commanded sequence corresponding to the power conversion commands generated by the control module 204 to cause the rotor of the motor 220 to rotate in the commanded direction, where the duty cycle or duration of activation of the respective inverter phase legs influences the amplitude of the current flow through the motor stator windings to control the rotational speed of the rotor. In exemplary implementations when the motor 220 is realized as a BLDC motor, the position sensing arrangement 230 is realized as a set of Hall effect sensors that provided measurement data indicative of the current state or position of the rotor of the motor 220 in relation to the stator windings, which, in turn, is utilized by the control module 204 to determine which set of motor stator windings should be excited to produce subsequent rotation of the rotor based on the angular position of the rotor with respect to the motor stator windings. That said, it should be appreciated that the subject matter described herein is not limited to BLDC motors or Hall effect sensors, and in practice, the subject matter may be implemented in an equivalent manner in the context of a different type of motor 220 and/or a different type of rotor position sensing arrangement 230 (e.g., encoders, resolvers, or the like).

Still referring to FIG. 2, in exemplary embodiments, the actuation system 200 includes a voltage regulation arrangement 208 coupled between a power supply input node associated with the energy source 240 and one or more supply reference voltage nodes associated with the inverter 210 to provide a regulated output voltage at a respective supply reference voltage node of the inverter 210. For example, in one or more implementations, the power supply input node associated with the energy source 240 may be realized as a higher voltage bus, which may be regulated or unregulated, where the voltage regulation arrangement 208 includes one or more individual voltage regulating power converters, where each of the individual voltage regulating power converters is coupled between the voltage bus and one or more of the respective supply reference voltage nodes coupled to respective phase legs of the inverter 210. In this regard, the voltage regulation arrangement 208 may be configurable to provide a substantially constant or otherwise controlled output voltage(s) to the supply reference voltage node(s) of the inverter 210. For example, as described in greater detail below, in some situations, one or more voltage regulating power converters of the voltage regulation arrangement 208 may be configured to provide a substantially constant DC output voltage at one or more of the supply (or positive) reference voltage nodes of the inverter 210, while in other situations, one or more voltage regulating power converters of the voltage regulation arrangement 208 may be configured to provide an alternating current (AC) output voltage at the supply (or positive) reference voltage node(s) of the inverter 210.

As described in greater detail below, in exemplary implementations, the control module 204 may be configurable to control operation of the voltage regulation arrangement 208 in concert with operation of the inverter 210 to provide improved efficiency over a wider range of operating points, for example, by varying one or more of the type of modulation (e.g., pulse amplitude modulation (PAM), pulse width modulation (PWM), pulse frequency modulation (PFM) and/or the like), switching frequency, regulated output voltage, phase leg sequencing and/or other parameters associated with the voltage regulation arrangement 208 and/or the inverter 210. In this regard, the individual voltage regulating power converters of the voltage regulation arrangement 208 support hybrid operation of the inverter 210 and motor 220 by varying the type of commutation (e.g., DC synchronous, AC induction, asynchronous operation and/or the like) based on the current state of the motor 220 (e.g., the current motor speed, the current rotor position, the current motor torque and/or the like), while also supporting potentially different motor topologies or winding configurations (e.g., redundant 3-phase, 6-phase, 4-phase, and/or the like) by dynamically varying activation of phase legs of the inverter 210 to provide redundancy or otherwise fail operational capabilities.

Figure 3:
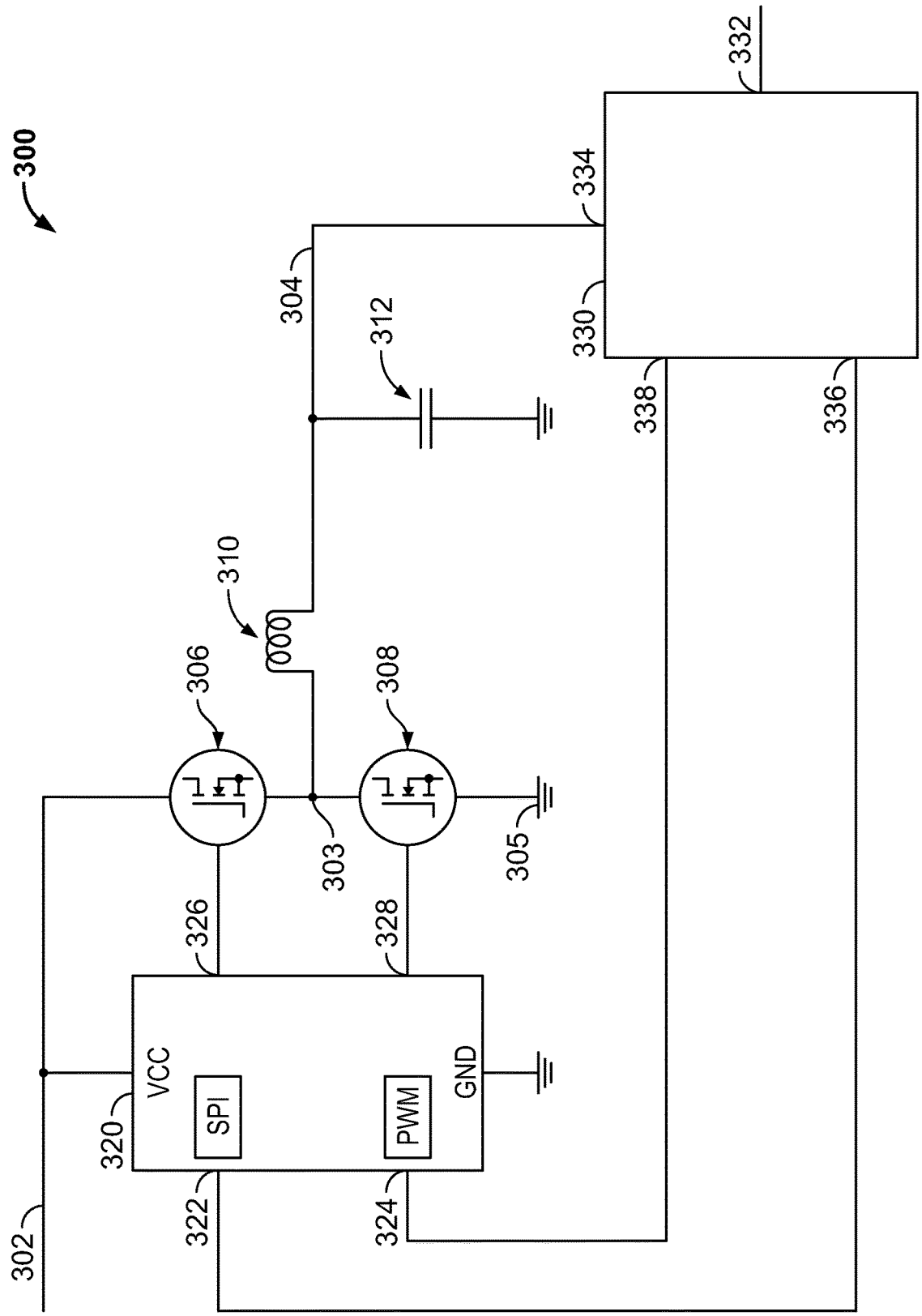
FIG. 3 is a block diagram of an exemplary embodiment of a programmable voltage regulating power converter suitable for use in the voltage regulation arrangement in the actuation system of FIG. 2 in accordance with one or more embodiments.

FIG. 3 depicts an exemplary embodiment of a programmable voltage regulating power converter 300 suitable for use in the voltage regulation arrangement 208 between the energy source 240 and one or more phase legs of the inverter 210 to receive an input voltage at a power supply input node 302 and provide a controlled or regulated output voltage at an output reference voltage node 304. The illustrated voltage regulating power converter 300 includes a step-down buck converter including a first transistor 306 or other suitable switching element coupled between the power supply input node 302 and an intermediate node 303, a second transistor 308 or other suitable switching element coupled between the intermediate node 303 and a ground reference voltage node 305, an inductor 310 or other suitable inductive element coupled between the intermediate node 303 and the output reference voltage node 304, and a capacitor 312 or other suitable capacitive element coupled between the output reference voltage node 304 and the ground reference voltage node 305.

The illustrated programmable voltage regulating power converter 300 includes a programmable converter modulator driver 320, which generally represents the hardware, software, firmware, circuitry, logic and/or other components configured to control operation of the transistors 306, 308 of the step-down buck converter to provide a regulated voltage at the output reference voltage node 304 in accordance with converter command signals received at input interfaces 322, 324 of the converter modulator driver 320. In exemplary implementations, the converter modulator driver 320 includes a first interface 322 that is configured to receive configuration command signals that indicate the commanded switching frequency for operating the transistors 306, 308, the commanded sequence for operating the transistors 306, 308, and potentially other configuration commands for controlling or otherwise influencing operation of the transistors 306, 308. In practice, the first interface 322 may be realized as a serial peripheral interface (SPI) or other suitable combination of pins, connectors, terminals, ports or other input nodes associated with the converter modulator driver 320. Additionally, the converter modulator driver 320 includes a second interface 324 that is configured to receive duty cycle command signals that indicate the duty cycle for operating the transistors 306, 308 of the step-down buck converter to achieve the desired voltage at the output reference voltage node 304. The converter modulator driver 320 includes output interfaces 326, 328 coupled to the respective control terminals of the transistors 306, 308 or other switching elements (e.g., the gate terminal, the base terminal and/or the like) to alternately activate and/or deactivate the transistors 306, 308 in accordance with the duty cycle commands at the duty cycle command interface 324 with a commanded switching frequency and sequence in accordance with the configuration commands at the first interface 322.

Still referring to FIG. 3, the programmable voltage regulating power converter 300 includes a processing module 330, which generally represents a digital signal processor, a microprocessor, or other suitable processing device associated with the programmable voltage regulating power converter 300 that is configurable to determine the converter configuration and duty cycle commands provided at the input interfaces 322, 324 of the converter modulator driver 320. In exemplary implementations, the processing module 330 includes one or more input interfaces 332 configurable to receive feedback measurement data indicative of the current state of the motor 220 or other electrical load receiving power from the output reference voltage node 304 of the programmable voltage regulating power converter 300 along with command data indicative of a targeted state for the motor 220 or other electrical load. For example, one or more of the input interfaces 332 of the processing module 330 may be coupled to the control module 204 and/or the flight control module 106 to receive input commands for the motor 220 that indicate a targeted or desired speed, rotor position, output torque, motor current, direction of rotation, and/or other state for the motor 220. In various implementations, the processing module 330 may also be configurable to receive a commanded output voltage to be provided by the voltage regulating power converter 300 at the output reference voltage node 304. Additionally, one or more of the input interfaces 332 of the processing module 330 may be coupled to the sensing arrangement 230 to include feedback measurement data indicative of the current rotor position, the current motor speed, the current motor current, and/or the like. In exemplary implementations, the processing module 330 also includes an input interface 334 coupled to the output reference voltage node 304 to measure or otherwise obtain the current value or state of the voltage at the output reference voltage node 304 (e.g., via one or more analog-to-digital converters).

As described in greater detail below, based on the relationships between the input motor commands and the feedback measurement data indicative of the current state of the motor 220 and any difference between the commanded output voltage and the current voltage at the output reference voltage node 304, the processing module 330 calculates or otherwise determines corresponding converter configuration and PWM duty cycle commands to be provided to the converter modulator driver 320 via respective output interfaces 336, 338 of the processing module 330 to vary operation of the transistors 306, 308 to regulate the output voltage at the output reference voltage node 304 in accordance with the input motor commands. In this regard, it should be appreciated that although FIG. 3 depicts the processing module 330 as a separate or distinct processing device associated with the programmable voltage regulating power converter 300, in practice, some or all of the features or functionality described herein in the context of the processing module 330 may be implemented by or at the control module 204, in which case, a separate or distinct processing module 330 associated with the programmable voltage regulating power converter 300 may not be present in some implementations of the programmable voltage regulating power converter 300.

Figure 4:
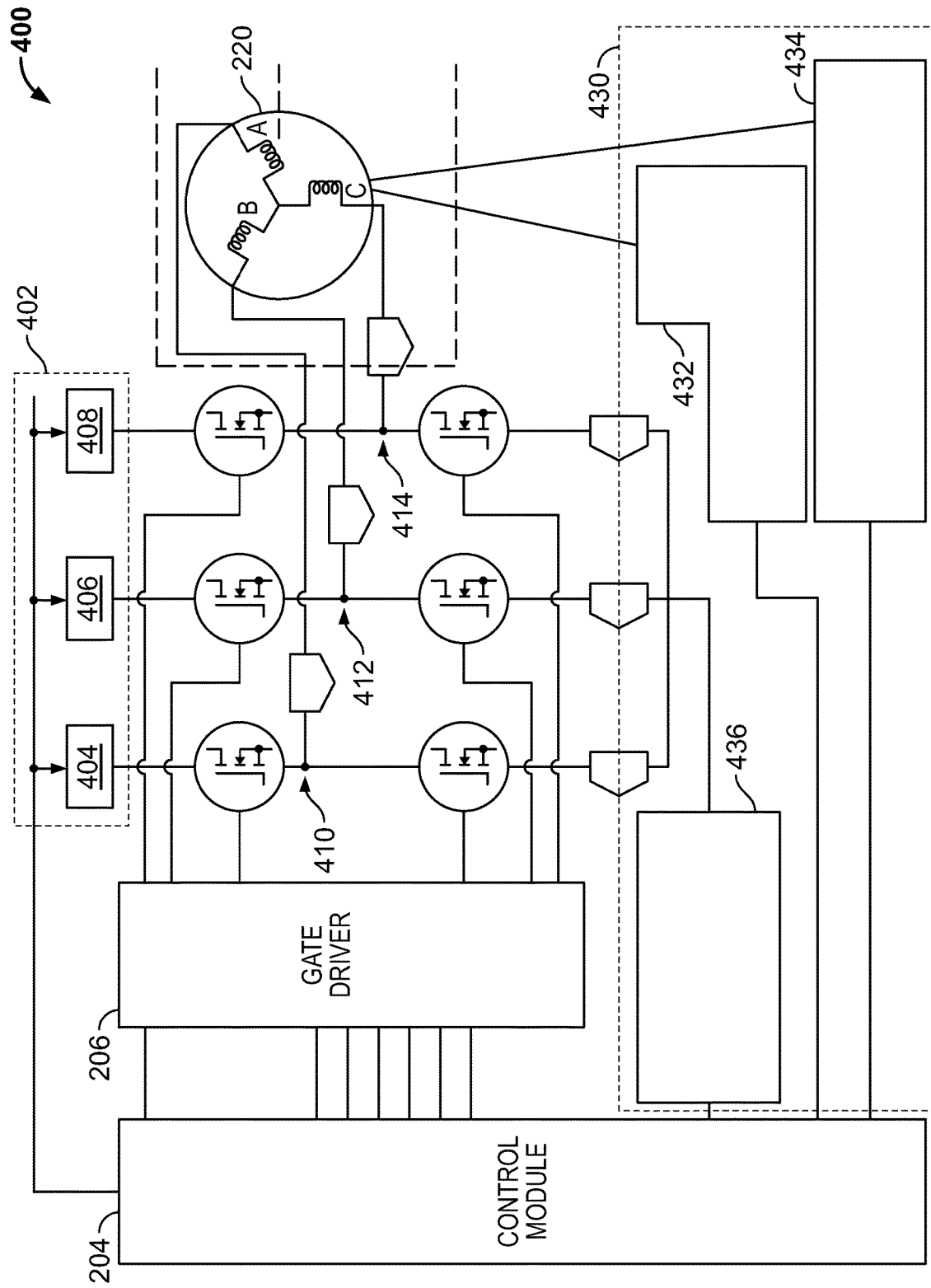
FIG. 4 is a block diagram of an exemplary embodiment of an actuation system including multiple instances of the programmable voltage regulating power converter of FIG. 3 in accordance with one or more embodiments.

Referring now to FIG. 4, with reference to FIGS. 1-3, in one or more implementations, an actuation system 400 includes a voltage regulation arrangement 402 (e.g., voltage regulation arrangement 208) having individual programmable voltage regulating power converters 404, 406, 408 (e.g., separate and distinct individual instances of the programmable voltage regulating power converter 300) that are coupled between a power supply input node associated with an energy source (e.g., energy source 240) and a respective regulated supply reference voltage node (e.g., output reference voltage node 304) associated with a respective phase leg 410, 412, 414 of a power conversion arrangement (e.g., inverter 210). In this regard, FIG. 4 depicts an example where the actuator or other electrical load associated with the actuation system 400 is realized as an electric motor 220 having a 3-phase winding configuration, where each phase of windings is connected to a corresponding phase leg 410, 412, 414 of the power conversion arrangement. As shown, a first phase leg 410 includes a first transistor or switching element coupled between the output reference voltage node 304 of a first programmable voltage regulating power converter 404 and an end of a first phase of stator windings of the electric motor 220 and a second transistor or switching element coupled between that end of the stator windings and a ground or negative reference voltage node, a second phase leg 412 includes a set of similarly configured transistors coupled between the output reference voltage node 304 of a second programmable voltage regulating power converter 404, the negative supply reference voltage node and an end of a second phase of stator windings of the electric motor 220, and a third phase leg 414 includes a corresponding set of transistors coupled between the output reference voltage node 304 of a third programmable voltage regulating power converter 406, the negative supply reference voltage node and an end of a third phase of stator windings of the electric motor 220.

In the illustrated embodiment of FIG. 4, the actuation system 400 includes a motor sensing system 430 (e.g., sensing arrangement 230) that includes a motor (or rotor) position sensing arrangement 432, a motor (or rotor) speed sensing arrangement 434, and a motor current sensing arrangement 436. The motor position sensing arrangement 432 may be realized as a resolver, encoder or other suitable position sensor capable of providing an output measurement value indicative of a measured position of the rotor of the motor 220. The motor speed sensing arrangement 434 may include one or more Hall effect sensors or other suitable sensors capable of providing an output measurement value indicative of a measured rotational speed of the rotor of the motor 220. The motor current sensing arrangement 436 may be realized as one or more current sensors capable of providing an output measurement value indicative of the cumulative amount of electrical current flowing through the respective phases of the motor 220. The rotor position measurement data, rotor speed measurement data, and motor current measurement data obtained via the respective sensing arrangements 432, 434, 436 are input or otherwise provided to the control module 204 to provide feedback measurement data indicative of the current state of the motor 220.

As described in greater detail below, based on the input commands from the flight control computer 106 or other supervisory control system, the control module 204 may calculate or otherwise determine a targeted speed for the motor 220, a targeted motor current for the motor 220, a targeted output torque for the motor 220, and/or a targeted regulated output voltage for one or more of the voltage regulating power converters 404, 406, 408 for producing the commanded actuation of a flight control component coupled to or otherwise associated with the motor 220. Based on the targeted motor speed, the targeted motor current, the targeted motor torque and/or the targeted regulated output voltages, the control module 204 provides corresponding commands to the processing modules 330 of the voltage regulating power converters 404, 406, 408 and the gate driver circuitry 206 to operate the voltage regulating power converters 404, 406, 408 and the inverter phase legs 410, 412, 414 to achieve the targeted actuation of the motor 220 and flight control component.

In exemplary embodiments described herein, based on a difference between the current state of the motor 220 indicated by the feedback measurement data from the sensing arrangements 432, 434, 436 of the sensing system 430 and the targeted state for the motor 220, the control module 204 and/or the processing module 330 are configured to dynamically vary the regulated output voltage provided by one or more of the voltage regulating power converters 404, 406, 408 to reduce the difference between the current state of the motor 220 and the targeted (or commanded) state of the motor 220 to achieve the commanded actuation of the flight control component. For example, in one or more implementations, when the measured speed of the motor 220 is greater than the targeted or commanded speed for the motor 220, the control module 204 may be configured to provide a command signal to the processing module 330 of one or more of the voltage regulating power converters 404, 406, 408 to decrease or reduce the regulated output voltage, to thereby reduce the current through the motor 220 to cause the rotor to decelerate and regulate the motor speed to the target speed. On the other hand, when the measured speed of the motor 220 is less than the commanded speed for the motor 220, the control module 204 may command the voltage regulating power converters 404, 406, 408 to increase the regulated output voltage, to thereby increase the current supplied to the motor 220 to cause the rotor to accelerate and regulate the motor speed to the target speed. In a similar manner, when the measured current or measured torque associated with the motor 220 is less than the targeted or commanded current or torque for the motor 220, the control module 204 may command the voltage regulating power converters 404, 406, 408 to increase the regulated output voltage, or vice versa when the measured current or measured torque is greater than the targeted or commanded current or torque, to thereby regulate the motor current or motor torque to the desired or commanded state by varying the output of the regulating power converters 404, 406, 408. In this regard, varying the output of the regulating power converters 404, 406, 408 may be performed to improve efficiency by reducing or minimizing switching losses relative to varying the duty cycles or otherwise adjusting operation of the transistors of the phase legs 410, 412, 414.

Figure 5:
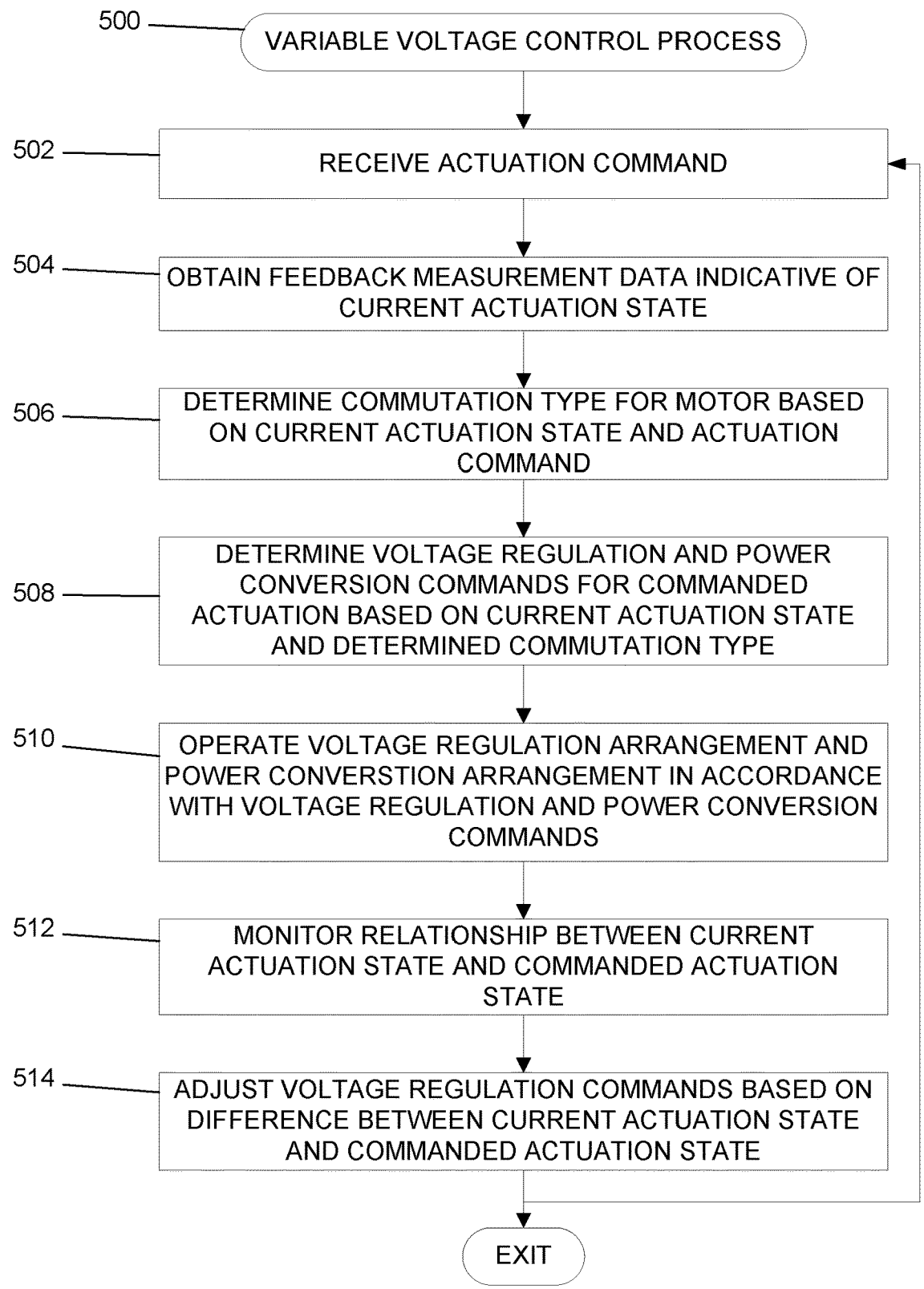
FIG. 5 is a flow diagram of an exemplary embodiment of a variable voltage control process suitable for implementation by the actuation system of FIG. 2 in the fly-by-wire system of FIG. 1 in accordance with one or more embodiments.

FIG. 5 depicts an exemplary variable voltage control process 500 suitable for implementation by an actuation system to achieve a commanded actuation of a motor or other actuator by dynamically varying a regulated voltage input to a power conversion arrangement associated with operating the motor. The various tasks performed in connection with the illustrated process may be implemented using hardware, firmware, software executed by processing circuitry, or any combination thereof. For illustrative purposes, the following description may refer to elements mentioned above in connection with FIGS. 1-4. In practice, portions of the variable voltage control process 500 may be performed by different elements of a vehicle system. That said, exemplary embodiments are described herein in the context of the variable voltage control process 500 being primarily performed by a motor control module 204 and/or processing module 330 associated with a programmable voltage regulating power converter 300. It should be appreciated that the variable voltage control process 500 may include any number of additional or alternative tasks, the tasks need not be performed in the illustrated order and/or the tasks may be performed concurrently, and/or the variable voltage control process 500 may be incorporated into a more comprehensive procedure or process having additional functionality not described in detail herein. Moreover, one or more of the tasks shown and described in the context of FIG. 5 could be omitted from a practical embodiment of the variable voltage control process 500 as long as the intended overall functionality remains intact.

The illustrated variable voltage control process 500 initializes or otherwise begins by receiving or otherwise obtaining an actuation command that includes information indicative of a commanded actuation state (task 502). For example, as described above in the context of FIGS. 1-2, a control module 204 associated with an actuation system 102, 200 may receive or otherwise obtain actuation commands from a flight control module 106 which indicate a commanded speed, position and/or other commanded actuation state attributes for a flight control component 104, which, in turn, may be utilized by the control module 204 to calculate or otherwise determine a corresponding commanded speed, position, torque and/or other actuation state attributes for the motor 220 or other actuator responsible for actuating the flight control component 104.

After receiving an actuation command, the variable voltage control process 500 receives or otherwise obtains feedback measurement data indicative of the current actuation state, determines a type of commutation or commutation topology to be utilized for the motor based on the current actuation state and the commanded actuation, and calculating or otherwise determining voltage regulation and power conversion commands for achieving the commanded actuation based on the current actuation state and the determined commutation type (tasks 504, 506, 508). For example, as described above, the control module 204 may receive or otherwise obtain feedback measurement data indicative of the current state of the motor 220 via one or more sensing arrangements 230, 432, 434, 436 to identify the current or real-time values that characterize the attributes defining the current state of actuation of the motor 220, including, but not limited to, the current rotor position, the current motor speed (e.g., the rotational speed of the rotor), the current motor current, the current motor torque, and/or the like. Based on the current actuation state of the motor 220 and the actuation command, in exemplary implementations, the control module 204 applies various commutation topology selection logic to identify the particular type of commutation or commutation topology to be utilized when subsequently operating the motor 220 to improve efficiency, provide a desired level of redundancy, and/or the like. In this regard, in various implementations, the motor 220 includes different sets of stator windings that are arranged or otherwise configured to support different effective motor topologies or configurations, including, but not limited to, 2-phase, 3-phase, 4-phase, 6-phase, redundant 3-phase, and/or the like, where different commutation types and corresponding motor topologies provide better efficiency depending on the current state of the motor 220. For example, in an implementation where the motor 220 includes six sets of stator windings, the control module 204 may determine that the commutation type to be utilized when operating the power conversion arrangement 210 should correspond to a six-phase BLDC motor topology and commutation when the current speed of the motor is below a threshold value or the commanded actuation corresponds to a motor torque command above a threshold value, while the control module 204 may alternatively determine that the commutation type to be utilized when operating the power conversion arrangement 210 should correspond to a three-phase AC induction motor topology and commutation when the current speed of the motor is above a threshold value or where the commanded actuation corresponds to lesser motor torque demand. In this regard, it should be appreciated that the subject matter described herein is not limited to any particular type of commutation or motor topology to be employed, and that in practice, the motor 220 and actuation system 200 may effectively function as a hybrid of different commutations and motor topologies.

After identifying the particular type of commutation or commutation topology to be utilized, the control module 204 calculates or otherwise determines corresponding power conversion commands for operating the power conversion arrangement 210 to achieve the commanded actuation state in accordance with the identified type of commutation, and additionally calculates or otherwise determines corresponding voltage regulations commands for operating the voltage regulation arrangement 208, 402 to support the operation of the power conversion arrangement 210. For example, to support a six-phase BLDC motor topology and commutation, the control module 204 may determine corresponding power conversion commands for operating six different phase legs of the inverter 210 corresponding to the respective motor phases in the appropriate sequence to produce the commanded rotation of the rotor. Based on the commanded motor torque corresponding to the actuation command, the control module 204 may determine corresponding voltage regulation commands for the voltage regulation arrangement 208, 402 to provide a substantially constant DC regulated output voltage to the respective phase legs of the inverter 210 to achieve the desired motor torque while producing the commanded rotation in the six-phase BLDC configuration. On the other hand, to support a three-phase AC induction motor topology and commutations, the control module 204 may determine power conversion commands for operating three different phase legs of the inverter 210 corresponding to the respective motor phases while deactivating or otherwise disabling operation of the other phase legs of the inverter 210 to minimize switching losses. Additionally, the control module 204 may determine corresponding voltage regulation commands for the voltage regulation arrangement 208, 402 to provide a variable and substantially sinusoidal AC regulated output voltage to the respective phase legs of the inverter 210 associated with the three phases of the motor 220 to be commutated, while providing voltage regulation commands to effectively disable or otherwise deactivate any individual instances of programmable voltage regulating power converters 300 associated with those inactive phases to minimize switching losses associated with the voltage regulation arrangement 208, 402. In this regard, it should be appreciated that the subject matter described herein is not limited to any particular type or combination of voltage regulation commands and power conversion commands that may be utilized in practice to achieve a desired actuation.

After determining voltage regulation and power conversion commands for achieving the commanded actuation using the determined commutation type, the variable voltage control process 500 continues by operating the voltage regulation arrangement and power conversion arrangement in accordance with the determined commands to commutate the motor in the desired manner (task 510). In this regard, the control module 204 provides duty cycles, modulation commands or other power conversion commands to the gate driver circuitry 206 which operates the phase legs of the inverter 210 or other power conversion arrangement in accordance with the input modulation commands to achieve the desired commutation of the motor 220. Concurrently, the control module 204 provides voltage commands, frequency commands and/or other voltage regulation commands to the processing modules 330 of the respective programmable voltage regulating power converters 300 of the voltage regulation arrangement 208, which, in turn provides corresponding PWM duty cycle commands to the duty cycle command interface 324 and configuration commands to the configuration command interface 322 that are configured to cause the converter modulator driver 320 to operate the transistors 306, 308 to provide a controlled or regulated output voltage at the output reference voltage node 304 that corresponds to the respective voltage command, frequency command and/or other voltage regulation command determined by the control module 204 for the respective phase. In this manner, the programmable voltage regulating power converters 300 of the voltage regulation arrangement 208 are operated in concert with the phase legs of the inverter 210 or other power conversion arrangement to achieve the commanded actuation of the motor 220.

In exemplary embodiments, the variable voltage control process 500 monitors the relationship between the current actuation state and the commanded actuation state and dynamically adjusts one or more of the voltage regulation commands being implemented at the voltage regulation arrangement based on nay difference between the current actuation state and the commanded actuation state to reduce the difference or otherwise regulate the current actuation state to the commanded actuation state until receiving an updated actuation command (tasks 512, 514). In this regard, the measurement data indicative of the current actuation state of the motor 220 provided by one or more sensing arrangements 230, 432, 434, 436 may be fed back to the control module 204 and/or the processing module 330 to effectively provide closed-loop control of the motor 220 by dynamically varying or adjusting the regulated output voltage at the respective nodes 304 of the respective programmable voltage regulating power converters 300. For example, when the measured speed of the motor 220 is below the targeted or commanded motor speed, the control module 204 and/or the processing module 330 may be configured to adjust one or more of the commands input to the converter modulator driver 320 to increase the voltage and/or frequency of the voltage at the output node 304. Conversely, when the measured speed of the motor 220 is above the targeted or commanded motor speed, the control module 204 and/or the processing module 330 may be configured to adjust one or more of the commands input to the converter modulator driver 320 to decrease the voltage and/or frequency of the voltage at the output node 304. In this regard, by adjusting the voltage regulation arrangement 208, the variable voltage control process 500 simplifies the operation of the power conversion arrangement 210 and may reduce switching losses associated with the power conversion arrangement 210, thereby improving efficiency by using the more efficient programmable voltage regulating power converter 300 to incrementally adjust or otherwise fine tune control of the motor 220.

For example, when the motor 220 is being commutated as a 3-phase AC induction machine, the control module 204 and/or the processing module 330 may increase the amplitude and/or the frequency of the AC voltage being provided by the respective programmable voltage regulating power converters 300 associated with the active phase legs 410, 412, 414 while maintaining the phase legs 410, 412, 414 continually active to deliver the AC voltage to the respective phases of stator windings without switching losses at the inverter 210. In a similar manner, when the motor 220 is being commutated as a BLDC machine, the control module 204 and/or the processing module 330 may increase the amplitude of the DC voltage being provided by the respective programmable voltage regulating power converters 300 to increase the motor torque or speed without altering the sequence, duty cycles and/or switching frequency for the phase legs of the inverter 210.

It should be appreciated that use of the programmable voltage regulating power converters 300 in concert with the variable voltage control process 500 allows the actuation system 102, 200 to provide more efficient operation over a wider range of potential operating points while providing fail operational reliability and redundancy to support VTOL aircraft and other aerial vehicles or rotorcraft. For example, in one or more implementations, the motor 220 may be realized as a six-phase motor with six sets of stator windings connected to corresponding phase legs of a six-phase inverter, where each phase leg of the inverter is supplied by a respective instance of a programmable voltage regulating power converters 300. Depending on the commanded actuation and the state of the motor, the phase legs of the inverter may be operated to provide 2-phase, 3-phase, 4-phase or 6-phase commutation of the motor. Additionally, the operation of the programmable voltage regulating power converters 300 and the inverter phase legs may be coordinated to support different types of modulation, including PWM, pulse amplitude modulation (PAM), pulse frequency modulation (PFM) and/or the like, while also being cooperatively configurable to support DC or AC operation of the motor by providing a corresponding DC or AC regulated supply voltage to the active phase legs. In this regard, the control module 204 and/or the processing module 330 may include software or other logic that is configurable to dynamically determine the particular type of commutation, modulation and/or the like to be utilized at any point in time to maximize efficiency (e.g., by minimizing switching losses), provide redundancy, and/or the like, with feedback measurement data indicative of the current state of actuation of the motor being utilized to dynamically adjust or otherwise fine tune the regulated supply voltage provided to the active phase legs to track the targeted actuation of the motor corresponding to the commanded actuation of the flight control component.

For example, for a VTOL aircraft, UAM vehicle or other vehicle having a propulsion system including a 6-phase electric motor 220 configured to operate any one of the propulsion components 104, at takeoff where an input command from a flight control computer 106 may correspond to a 4000 rpm command speed, the motor control module 204 may determine to commutate the motor 220 as a 6-phase BLDC motor while the motor speed is less than a 5000 rpm threshold value. To commutate the motor 220 as a 6-phase BLDC motor, the control module 204 may operate the programmable voltage regulating power converters 300 of the voltage regulation arrangement 208 to provide a fixed DC voltage of 88 Volts relative to a 270 Volt bus voltage at the power supply input node 302 while operating the inverter 210 to provide 6-phase BLDC control based on an 88 Volt DC input voltage at their respective output reference voltage nodes 304 until the target motor speed of 4000 rpm is reached based on the measured motor speed feedback from the motor speed sensing arrangement 434 using a set duty cycle for the inverter phase legs (e.g., 80%) that maps back to targeted motor speed command (e.g., since motor speed is proportional to the input voltage for a BLDC motor). In this regard, while operating motor as 6-phase BLDC, when the speed feedback measurement or the targeted motor speed command changes, the control module 204 may operate the programmable voltage regulating power converters 300 of the voltage regulation arrangement 208 to adjust the output voltage at the respective output reference voltage nodes 304 to regulate the speed feedback measurement to the targeted motor speed command.

Thereafter, when targeted motor speed command changes, for example, in response to transitioning from a takeoff or climbing flight phase to a cruising flight phase, and/or in response to the measured motor speed exceeding the 5000 rpm threshold value, the motor control module 204 may determine to commutate the motor 220 as a 3-phase AC induction motor. To commutate the 6-phase motor 220 as a 3-phase AC induction motor, the motor control module activates three of the phases of the inverter 210 (e.g., a duty cycle of 100%) that are associated with respective motor phases that are 120 degrees apart electrically, and then deactivates the remaining phases of the inverter 210 (e.g., a duty cycle of 0%) to conserve energy. Concurrently, the motor control module 204 operates the programmable voltage regulating power converters 300 of the voltage regulation arrangement 208 associated with the active phases of the inverter 210 to provide a substantially sinusoidal AC voltage of 220 Volts from the 270 Volt bus voltage at the power supply input node 302 while operating remaining programmable voltage regulating power converters 300 of the voltage regulation arrangement 208 associated with the inactive phases of the inverter 210 with a duty cycle of 0% to conserve energy. While operating motor as 3-phase AC, when the speed feedback measurement or the targeted motor speed command changes, the control module 204 may operate the programmable voltage regulating power converters 300 of the voltage regulation arrangement 208 to adjust the amplitude and/or frequency of the output voltage at the respective output reference voltage nodes 304 to regulate the speed feedback measurement to the targeted motor speed command.

It will be appreciated that the subject matter described herein provides a redundant and efficient multiphase motor and driver capable of supporting multiple sub-phases and partitioned excitations and improved system efficiency, which translates to increased miles per kilowatt-hour (kWh) for UAM, VTOL and other electric propulsion vehicles. In addition to supporting PWM, the subject matter described herein supports PAM and PFM as well as field angle modulation for a more efficient operation over a wider range of operating points. This, in turn, may reduce power demand, and thereby reduce battery size, weight and other costs while providing added value in a highly redundant, reliable and failsafe system. Programmable DC-to-DC converters with variable parameters can be controlled and regulated in real-time via software, while hybrid combinations of phases can be employed to create multiple motor commutation sub-topologies (e.g., 6-phase, redundant 3-phase, 4-phase, redundant 2-phase, 3-phase, 2-phase, etc.) based on power demand at different torques and speeds, spanning DC synchronous, AC Induction asynchronous or a hybrid mode of operation, and avoiding a single point of failure by providing the capability of switching between motor topology and operating mode. Switching losses can also be reduced during commutation with selective phase excitation and deactivation of phases that are not being commutated.

For the sake of brevity, conventional techniques related to avionics systems, VTOL aircraft or other UAM vehicles, rotorcraft or other aircraft, fly-by-wire systems, motor controls, power converters, voltage regulators, and other functional aspects of the systems (and the individual operating components of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in an embodiment of the subject matter.

As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims.

Those of skill in the art will appreciate that the various illustrative logical blocks, modules, circuits, and algorithm steps described in connection with the embodiments disclosed herein may be implemented in varying ways for each particular application, but such implementation decisions should not be interpreted as causing a departure from the scope of the present invention. In addition, those skilled in the art will appreciate that embodiments described herein are merely exemplary implementations.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, the foregoing description may refer to elements or nodes or features being "coupled" together. As used herein, unless expressly stated otherwise, "coupled" means that one element/node/feature is directly or indirectly joined to (or directly or indirectly communicates with) another element/node/feature, and not necessarily mechanically. For example, two elements may be coupled to each other physically, electronically, logically, or in any other manner, through one or more additional elements. Thus, although the drawings may depict one exemplary arrangement of elements directly connected to one another, additional intervening elements, devices, features, or components may be present in an embodiment of the depicted subject matter. In addition, certain terminology may also be used herein for the purpose of reference only, and thus are not intended to be limiting.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A system comprising:
    a voltage regulation arrangement coupled between a power supply input node and a reference voltage node, wherein the voltage regulation arrangement is operable to provide a regulated output voltage at the reference voltage node;
    a power conversion arrangement coupled between the reference voltage node and an output node to provide power from the reference voltage node to an electrical load coupled to the output node; and
    a control module coupled to the voltage regulation arrangement to provide a command to vary the regulated output voltage at the reference voltage node based on feedback measurement data pertaining to the electrical load.

2. The system of claim 1, wherein:
    the electrical load comprises a motor; and
    the feedback measurement data is indicative of a current actuation state of the motor; and
    the control module provides the command to adjust the regulated output voltage based on a difference between the current actuation state and a targeted actuation state.

3. The system of claim 2, wherein:
    the current actuation state comprises a measured speed of the motor; and
    the control module provides the command to increase an amplitude of the regulated output voltage when the measured speed is less than a target speed for the motor.

4. The system of claim 2, wherein:
    the current actuation state comprises a measured speed of the motor; and
    the control module provides the command to increase a frequency of the regulated output voltage when the measured speed is less than a target speed for the motor.

5. The system of claim 1, wherein:
    the electrical load comprises a motor; and
    the control module is configurable to determine a commutation type for the motor based at least in part on the feedback measurement data and provide the command to vary the regulated output voltage at the reference voltage node in a manner that is influenced by the commutation type.

6. The system of claim 1, wherein:
    the electrical load comprises a motor; and
    the control module is configurable to determine a commutation type for the motor based at least in part on the feedback measurement data and provide power conversion commands to operate the power conversion arrangement in accordance with the commutation type.

7. The system of claim 6, wherein the control module is configurable to determine a voltage regulation command to operate the voltage regulation arrangement in accordance with the commutation type, wherein the control module is configurable to adjust the voltage regulation command to vary the regulated output voltage at the reference voltage node based on the feedback measurement data indicating a current actuation state of the motor different from a commanded actuation state.

8. A method of operating an electrical load, the method comprising:
    operating a power conversion arrangement coupled between a reference voltage node and an output node coupled to the electrical load to provide power from the reference voltage node to the electrical load;
    obtaining measurement feedback associated with operation of the electrical load in response to the power from the reference voltage node; and
    operating a voltage regulation arrangement coupled to the reference voltage node to adjust a regulated output voltage at the reference voltage node based on a difference between the measurement feedback and a performance target associated with the electrical load while concurrently operating the power conversion arrangement to adjust the power to the electrical load in response to adjusting the regulated output voltage.

9. The method of claim 8, wherein:
the electrical load comprises a motor;
the measurement feedback comprises at least one of a measured current, a measured speed and a measured position; and
the performance target comprises at least one of a target motor current, a target motor speed and a target motor position.

10. The method of claim 8, wherein:
the electrical load comprises an actuator; and
operating the voltage regulation arrangement comprises commanding the voltage regulation arrangement to increase the regulated output voltage at the reference voltage node when the measurement feedback is indicative of an actuation state of the actuator that is less than the performance target.

11. The method of claim 10, wherein:
the actuator comprises an electric motor;
the power conversion arrangement comprises an inverter having a phase leg coupled between the reference voltage node and a set of stator windings of the electric motor and
the performance target comprises at least one of a target motor current, a target motor speed and a target motor position; and
the actuation state comprises at least one of a measured motor current, a measured motor speed, and a measured motor position.

12. The method of claim 8, the electrical load comprising an electric motor, wherein the method further comprises:
receiving an input command indicative of a targeted actuation associated with the electric motor;
determining a commutation type for the electric motor based at least in part on an actuation state of the electric motor and the targeted actuation; and
determining power conversion commands and voltage regulation commands for achieving the targeted actuation based at least in part on the commutation type and the current actuation state of the electric motor, wherein:
operating the power conversion arrangement comprises operating the power conversion arrangement in accordance with the power conversion commands for achieving the targeted actuation while concurrently operating the voltage regulation arrangement in accordance with the voltage regulation commands to provide the regulated output voltage at the reference voltage node.

13. The method of claim 12, wherein operating the voltage regulation arrangement to adjust the regulated output voltage comprises adjusting one or more of the voltage regulation commands to increase an amplitude of the regulated output voltage when the measurement feedback indicates the actuation state of the electric motor is less than the targeted actuation.

14. The method of claim 12, wherein operating the voltage regulation arrangement to adjust the regulated output voltage comprises adjusting one or more of the voltage regulation commands to increase a frequency of the regulated output voltage when the measurement feedback indicates the actuation state of the electric motor is less than the targeted actuation.

15. The method of claim 12, wherein operating the voltage regulation arrangement to adjust the regulated output voltage comprises adjusting one or more of the voltage regulation commands to decrease an amplitude of the regulated output voltage when the measurement feedback indicates the actuation state of the electric motor is greater than the targeted actuation.

16. The method of claim 12, wherein operating the voltage regulation arrangement to adjust the regulated output voltage comprises adjusting one or more of the voltage regulation commands to decrease a frequency of the regulated output voltage when the measurement feedback indicates the actuation state of the electric motor is greater than the targeted actuation.

17. The method of claim 8, wherein:
the electrical load comprises an electric motor;
the performance target comprises a targeted motor speed;
operating the power conversion arrangement comprises operating the power conversion arrangement to commutate the electric motor as an alternating current (AC) induction motor when a speed of the electric motor is greater than a threshold; and
operating the voltage regulation arrangement comprises operating the voltage regulation arrangement to adjust at least one of an amplitude and a frequency of the regulated output voltage at the reference voltage node based on a difference between the speed of the electric motor and the targeted motor speed.

18. The method of claim 17, further comprising operating the power conversion arrangement to commutate the electric motor as a direct current (DC) motor when the speed of the electric motor is less than the threshold.

19. A computer-readable medium having computer-executable instructions stored thereon that, when executed by a processing system, cause the processing system to:
operate a power conversion arrangement coupled between a reference voltage node and an output node coupled to an electrical load to provide power from the reference voltage node to the electrical load;
obtain measurement feedback associated with operation of the electrical load in response to the power from the reference voltage node; and
operate a voltage regulation arrangement coupled to the reference voltage node to adjust a regulated output voltage at the reference voltage node based on a difference between the measurement feedback and a performance target associated with the electrical load while concurrently operating the power conversion arrangement to adjust the power to the electrical load in response to adjusting the regulated output voltage.

20. The computer-readable medium of claim 19, wherein:
the electrical load comprises an electric motor;
the power conversion arrangement comprises an inverter having a phase leg coupled between the reference voltage node and a set of stator windings of the electric motor and
the performance target comprises at least one of a target motor current, a target motor speed and a target motor position; and
the measurement feedback comprises at least one of a measured motor current, a measured motor speed, and a measured motor position.

* * * * *